United States Patent
Klein et al.

(10) Patent No.: US 11,705,800 B2
(45) Date of Patent: Jul. 18, 2023

(54) HYDRAULIC ACTUATOR DEVICE AND METHOD FOR CREATING A PRESSURE BUILD-UP IN AT LEAST ONE PARTIAL VOLUME OF A HYDRAULIC SYSTEM FILLED WITH AN ELECTRICALLY CONDUCTIVE MEDIUM

(71) Applicant: Robert Bosch GmbH, Stuttgart (DE)

(72) Inventors: Rico Alf Klein, Heilbronn (DE); Vaclav Kocourek, Beilstein (DE); Thomas Friedrich, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 319 days.

(21) Appl. No.: 16/637,891

(22) PCT Filed: Jun. 14, 2018

(86) PCT No.: PCT/EP2018/065910
§ 371 (c)(1),
(2) Date: Feb. 10, 2020

(87) PCT Pub. No.: WO2019/034300
PCT Pub. Date: Feb. 21, 2019

(65) Prior Publication Data
US 2020/0220445 A1 Jul. 9, 2020

(30) Foreign Application Priority Data
Aug. 15, 2017 (DE) .......................... 102017214173.5

(51) Int. Cl.
*H02K 44/04* (2006.01)
*F15B 21/06* (2006.01)
(Continued)

(52) U.S. Cl.
CPC ............. *H02K 44/04* (2013.01); *F15B 19/00* (2013.01); *F15B 21/065* (2013.01); *F15B 21/08* (2013.01);
(Continued)

(58) Field of Classification Search
CPC ........ F15B 21/08; F15B 21/065; F15B 19/00; H02K 44/04; H05B 1/0297
See application file for complete search history.

(56) References Cited

U.S. PATENT DOCUMENTS

| | | |
|---|---|---|
| 3,348,487 A | 10/1967 | Miller |
| 4,557,667 A | 12/1985 | Delassus et al. |

(Continued)

FOREIGN PATENT DOCUMENTS

| | | |
|---|---|---|
| CN | 101981792 A | 2/2011 |
| DE | 102006041863 A1 | 3/2008 |

(Continued)

OTHER PUBLICATIONS

Machine Translation of DE102006041863A1 via Espacenet.*
International Search Report for PCT/EP2018/065910, dated Aug. 24, 2018.

*Primary Examiner* — Abiy Teka
*Assistant Examiner* — Daniel S Collins
(74) *Attorney, Agent, or Firm* — Norton Rose Fulbright US LLP; Gerard Messina (57) ABSTRACT

A hydraulic actuator device for a hydraulic system filled with an electrically conductive medium, the hydraulic actuator device being situatable or being situated on and/or in the hydraulic system, and including at least one actuator module, which in each case is designed in such a way that at least a portion of the electrically conductive medium is accelerable into at least one partial volume of the hydraulic system due to its interaction with an electrical current flow generated with the aid of the respective actuator module (Continued)

and/or with a magnetic field created with the aid of the respective actuator module, as a result of which a pressure build-up is creatable in the at least one partial volume of the hydraulic system.

12 Claims, 6 Drawing Sheets

(51) Int. Cl.
    *F15B 19/00*     (2006.01)
    *F15B 21/08*     (2006.01)
    *H05B 1/02*     (2006.01)
    *F16D 65/14*     (2006.01)
    *F16D 121/04*     (2012.01)

(52) U.S. Cl.
    CPC ........... *H05B 1/0297* (2013.01); *F16D 65/14* (2013.01); *F16D 2121/04* (2013.01); *F16D 2200/0034* (2013.01)

(56) References Cited

U.S. PATENT DOCUMENTS

| | | | |
|---|---|---|---|
| 4,767,953 A | 8/1988 | Furuya et al. | |
| 6,146,103 A | 11/2000 | Lee et al. | |
| 6,183,206 B1 | 2/2001 | Valenzuela et al. | |
| 7,973,474 B2 * | 7/2011 | Kim | H01L 27/3276 313/506 |
| 2006/0073023 A1 | 4/2006 | Ghoshal et al. | |
| 2007/0274840 A1 | 11/2007 | Ehben et al. | |
| 2013/0186473 A1 * | 7/2013 | Mankame | F16F 13/305 137/13 |
| 2015/0069680 A1 | 3/2015 | Kuri et al. | |
| 2017/0159682 A1 * | 6/2017 | Saadat | F04B 35/04 |

FOREIGN PATENT DOCUMENTS

| | | |
|---|---|---|
| EP | 0082095 A1 | 6/1983 |
| FR | 1259240 A | 4/1961 |
| FR | 1414029 A | 10/1965 |
| FR | 2086724 A5 | 12/1971 |
| FR | 2112791 A5 | 6/1972 |
| JP | H09309429 A | 12/1997 |
| JP | 2009029414 A | 2/2009 |
| JP | 2013160238 A | 8/2013 |
| WO | 9308633 A1 | 4/1993 |

\* cited by examiner

HYDRAULIC ACTUATOR DEVICE AND METHOD FOR CREATING A PRESSURE BUILD-UP IN AT LEAST ONE PARTIAL VOLUME OF A HYDRAULIC SYSTEM FILLED WITH AN ELECTRICALLY CONDUCTIVE MEDIUM

The present invention relates to a hydraulic actuator device for a hydraulic system filled with an electrically conductive medium. The present invention also relates to a temperature control device, a sensor device and a hydraulic system. The present invention further relates to a method for creating a pressure build-up in at least one partial volume of a hydraulic system filled with an electrically conductive medium, a method for controlling the temperature of an electrically conductive medium in a hydraulic system and a method for ascertaining a piece of information relating to a flow rate of an electrically conductive medium in a hydraulic system.

BACKGROUND INFORMATION

In the related art, a pressure build-up may be created in at least a partial volume of a hydraulic system by pumping and/or forcing a medium into the at least one partial volume with the aid of at least one motorized device such as, for example, at least one pump and/or at least one plunger device.

SUMMARY

The present invention provides an example hydraulic actuator device for a hydraulic system filled with an electrically conductive medium, an example temperature control device, an example sensor device, an example hydraulic system, an example method for creating a pressure build-up in at least one partial volume of a hydraulic system filled with an electrically conductive medium, an example method for controlling the temperature of an electrically conductive medium in a hydraulic system, and an example method for ascertaining a piece of information relating to a flow rate of an electrically conductive medium in a hydraulic system.

The present invention provides novel actuators for creating a pressure build-up in at least one partial volume of a hydraulic system, which are able to replace conventional/existing motorized devices. In contrast to the conventional/existing motorized devices, the operating principles of the novel actuators require no movable/moving elements/parts. This reduces a risk of damage to the novel actuators, increases their service life and reduces their installation space requirement and weight. It is noted that the novel actuators, by being designed with no movable/moving element/part, have an improved NVH (noise vibration harshness) behavior. The operating principle of the novel actuators also enables a uniform volume flow, it being possible to reliably and easily meter a total volume and a flow rate of the volume flow without the use of valves. The present invention thus enables an advantageous operation of valveless hydraulic systems which, due to their abandonment of valves, are able to dispense with the complex structure of conventional hydraulic systems. As a result, a risk of leakage in the valveless hydraulic systems implemented with the aid of the present invention is also significantly reduced.

In one advantageous specific embodiment of the hydraulic actuator device, the at least one actuator module includes at least one electrode unit and at least one magnetic unit, and a Lorentz force is creatable with the aid of the electrical current flow generated by the at least one electrode unit and of the magnetic field created by the at least one magnetic unit on at least the portion of the electrically conductive medium in such a way that at least the portion of the electrically conductive medium is acceleratable into the at least one partial volume of the hydraulic system against a counterforce acting against the pressure build-up. As a result, the hydraulic actuator device thus overcomes the counterforce on an electromagnetic-hydraulic basis, the generated Lorentz force accelerating at least the portion of the electrically conductive medium into the at least one partial volume of the hydraulic system. A total volume of the partial amount and a created acceleration of the portion of the electrically conductive medium are precisely determinable with the aid of the generated electrical current flow and of the created magnetic field, as a result of which conventionally required valves may be saved.

In another advantageous specific embodiment of the hydraulic actuator device, the at least one actuator module includes at least one coil unit, and an induction force is creatable with the aid of the chronologically varying magnetic field created by the at least one coil unit on at least the portion of the electrically conductive medium in such a way that at least the portion of the electrically conductive medium is acceleratable into the at least one partial volume of the hydraulic system against the counterforce acting against the pressure build-up. This specific embodiment of the hydraulic actuator device also yields the advantages described above.

The hydraulic actuator device preferably includes multiple actuator modules and is situatable or is situated on and/or in the hydraulic system in such a way that at least some of the actuator modules of the hydraulic actuator device situated on and/or in the hydraulic system are situated in succession on a medium line of the hydraulic system. With the aid of such a "serial arrangement" or "serial connection" of actuator modules, it is possible to achieve a comparatively high acceleration of the accelerated portion of the electrically conductive medium. Thus, with the aid of the "serial arrangement" or "serial connection" it is possible to also achieve a strong force/a high pressure.

As an alternative or in addition, the hydraulic actuator device may also include multiple actuator modules and may be situatable or may be situated on and/or in the hydraulic system in such a way that at least some of the actuator modules of the hydraulic actuator device situated on and/or in the hydraulic system are situated on at least two medium lines of the hydraulic system extending in parallel to one another. With the aid of the "parallel arrangement" or "parallel connection" of the actuator modules described herein, it is possible to increase the total volume of the accelerated portion of the electrically conductive medium. This operating principle may also be utilized to create a relatively rapid pressure build-up in the at least one partial volume of the hydraulic system.

A temperature control device for interacting with the previously described hydraulic actuator device and a sensor device for interacting with the hydraulic actuator device are also advantageous.

A hydraulic system including at least one corresponding hydraulic actuator device and the electrically conductive medium filled in the hydraulic system also yield the above described advantages.

The hydraulic system may, for example, be filled with an electrically conductive fluid, with an electrically conductive gas, with an ionic fluid, with at least one electrolyte, with at least one plasma, with at least one liquid metal, with gallium, with lithium, with sodium, with mercury, with a liquid metal alloy, with a gallium-indium-tin alloy and/or with a sodium-potassium alloy as the electrically conductive medium. The examples of the electrically conductive medium described herein are not to be regarded as exhaustive, however.

The hydraulic system may be a hydraulic work machine system, a robot, a hydraulic construction machine system, a hydraulic agricultural machine system, a hydraulic load hoisting system, a hydraulic elevator system, a hydraulic lifting platform system, a hydraulic braking system, a hydraulic transmission system, a hydraulic power steering system, a hydraulic chassis control system, a hydraulic convertible roof system, a hydraulic excavator system, a hydraulic tractor system, a hydraulic forklift system, a hydraulic crane system, a hydraulic forest machinery system, a hydraulic heavy-duty transport system, a hydraulic wing flap system, a hydraulic press system, a hydraulic scissor system, a hydraulic folding machine system, a hydraulic grinding machine system, a hydraulic chipping system, a hydraulic actuating drive system, a hydraulic mill system, a hydraulic punch system, and/or hydraulic fire department rescue tools. Thus, the present invention has versatile applications.

In addition, a corresponding example method for creating a pressure build-up in at least one partial volume of a hydraulic system filled with an electrically conductive medium yields the above described advantages. It is noted that the method according to the specific embodiments of the hydraulic actuator device explained above is refinable. The method for controlling the temperature of an electrically conductive medium in a hydraulic system is equally advantageous. In addition, an implementation of the method for analyzing an electrically conductive medium in a hydraulic system also yields advantages.

BRIEF DESCRIPTION OF THE DRAWINGS

Additional features and advantages of the present invention are explained below with reference to the figures.

DETAILED DESCRIPTION OF EXAMPLE EMBODIMENTS

Figure 1:
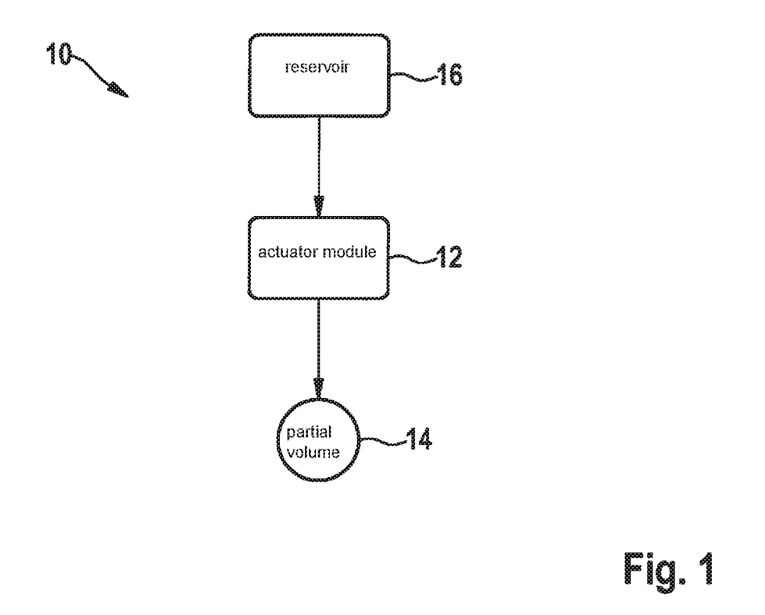
FIG. 1 schematically shows a representation of a first specific embodiment of the hydraulic actuator device, and of the hydraulic system equipped with the hydraulic actuator device.

FIG. 1 schematically shows a representation of a first specific embodiment of the hydraulic actuator device, and of the hydraulic system equipped with the hydraulic actuator device.

Hydraulic actuator device 10 schematically depicted in FIG. 1 is designed for a use in a hydraulic system filled with an electrically conductive medium. The hydraulic system schematically depicted in FIG. 1 is merely by way of example a hydraulic braking system for a vehicle/motor vehicle, a usability of the hydraulic braking system not being limited to a particular vehicle type/motor vehicle type. It is noted, however, that a designability/usability of the hydraulic system of FIG. 1 is not limited to this system type. The hydraulic system may, for example, also be a hydraulic work machine system, a robot, a hydraulic construction machine system, a hydraulic agricultural machine system, a hydraulic load hoisting system, a hydraulic elevator system, a hydraulic lifting platform system, a hydraulic braking system, a hydraulic transmission system, a hydraulic power steering system, a hydraulic chassis control system, a hydraulic convertible roof system, a hydraulic excavator system, a hydraulic tractor system, a hydraulic forklift system, a hydraulic crane system, a hydraulic forest machinery system, a hydraulic heavy-duty transport system, a hydraulic wing flap system, a hydraulic press system, a hydraulic scissor system, a hydraulic folding machine system, a hydraulic grinding machine system, a hydraulic chipping system, a hydraulic actuating drive system, a hydraulic mill system, a hydraulic punch system, and/or hydraulic fire department rescue tools.

The electrically conductive medium is understood to mean a medium having an electrical conductivity $\sigma$ greater than 1 S/m (Siemens by meter) or greater than 1 $(\Omega m)^{-1}$ (inverse of ohmmeter). The electrically conductive medium preferably has an electrical conductivity $\sigma$ greater than $10^2$ S/m, in particular, an electrical conductivity $\sigma$ greater than $10^3$ S/m, specifically an electrical conductivity $\sigma$ greater than $10^4$ S/m. (A high electrical conductivity $\sigma$ is advantageous for a low electrical resistance of a current flow through the electrically conductive medium). The electrically conductive medium may be present as an electrically conductive fluid and/or as an electrically conductive gas in the hydraulic system. For example, the electrically conductive medium is an ionic fluid, at least one electrolyte, at least one plasma, at least one liquid metal (such as, for example, gallium, lithium, sodium, mercury) and/or a liquid metal alloy (such as, for example, a sodium-potassium alloy). The hydraulic system is filled preferably with a gallium-indium-tin alloy ($\sigma=10^6$ S/m) as the electrically conductive medium. A gallium-indium-tin alloy is non-toxic. Moreover, a gallium-indium-tin alloy is liquid already above a temperature of approximately −20° C. (at atmospheric pressure) and is heatable without risk from a lower temperature to −20° C. or higher with the aid of an easy to implement heating technology.

The hydraulic actuator device 10 is situatable/is situated on and/or in the hydraulic system. The hydraulic actuator device includes at least one actuator module 12, which in each case is designed in such a way that at least a portion of the electrically conductive medium is acceleratable into at least a partial volume 14 of the hydraulic system due to its interaction with an electrical current flow generated with the aid of the respective actuator module 12 and/or with a magnetic field created with the aid of the respective actuator module 12. In this way, at least the accelerated portion of the electrically conductive medium is transferrable from reservoir 16 into at least one partial volume 14, such as, for example, into at least one wheel brake cylinder 14. With the aid of hydraulic actuator device 10, therefore, a pressure build-up/a pressure increase is creatable in the at least one partial volume 14 of the hydraulic system. A braking torque may be applied to at least one rotating wheel, for example, with the aid of the pressure build-up/of the pressure increase in the at least one partial volume 14 of the hydraulic system/braking system designed as wheel brake cylinder 14. A "through-flow" is of course also triggerable with the aid of hydraulic actuator device 10.

Hydraulic actuator device 10 may also be referred to as an electromechanical hydraulic actuator device 10. Examples of a possible operating principle of hydraulic actuator device 10 are discussed in greater detail below. Only actuator module 12 of hydraulic actuator device 10 is illustrated merely by way of example in FIG. 1. It is noted, however, that hydraulic actuator device 10 may also include multiple actuator modules 12, examples of a "series arrangement" and/or "parallel arrangement" of actuator modules 12 also being explained below.

The transfer of the accelerated portion of the electrically conductive medium takes place without utilizing a movable/moving element/part (such as for example a pump piston or a plunger). Instead, the transfer of the accelerated portion of the electrically conductive medium is effected exclusively with the aid of its (electrical, magnetic and/or electromagnetic) interaction with the at least one electrical current flow of the at least one actuator module 12 and/or with the at least one magnetic field of the at least one actuator module 12. As is explained in greater detail below, this interaction may be easily and reliably "metered." In contrast to conventional actuators (having a movable/moving element/part such as, for example, conventional pumps and plunger devices), hydraulic actuator device 10 thus has a higher dynamic and a "reversibility of its effect," i.e., a reversibility of the volume flow illustrated in FIG. 1 from reservoir 16 into the at least one partial volume 14 into a volume flow from the at least one partial volume 14 into reservoir 16. In contrast to conventional actuators (having a movable/moving element/part), it is also possible to reliably maintain a quantity specification of the accelerated portion of the electrically conductive medium and a predefined target rate, to which the accelerated portion of the electrically conductive medium is to be accelerated. Equipping the hydraulic system designed as a hydraulic braking system with at least one valve (for quantity regulation) is therefore unnecessary. Thus, a design of a long and complex control chain in the hydraulic system may also be dispensed with.

Another advantage of the hydraulic braking system depicted in FIG. 1 is the use of the electrically conductive medium (as a transfer medium) instead of a conventional brake fluid.

Conventional brake fluids have highly temperature-dependent properties, in particular, a highly temperature-dependent viscosity, whereas the viscosities of the examples of the electrically conductive medium enumerated above are not or are barely temperature-dependent. In contrast to conventional brake fluids having a significant outgassing behavior (i.e., vaporization of water at higher temperatures), the examples of the electrically conductive medium enumerated above also have (virtually) no outgassing behavior.

Figure 2:
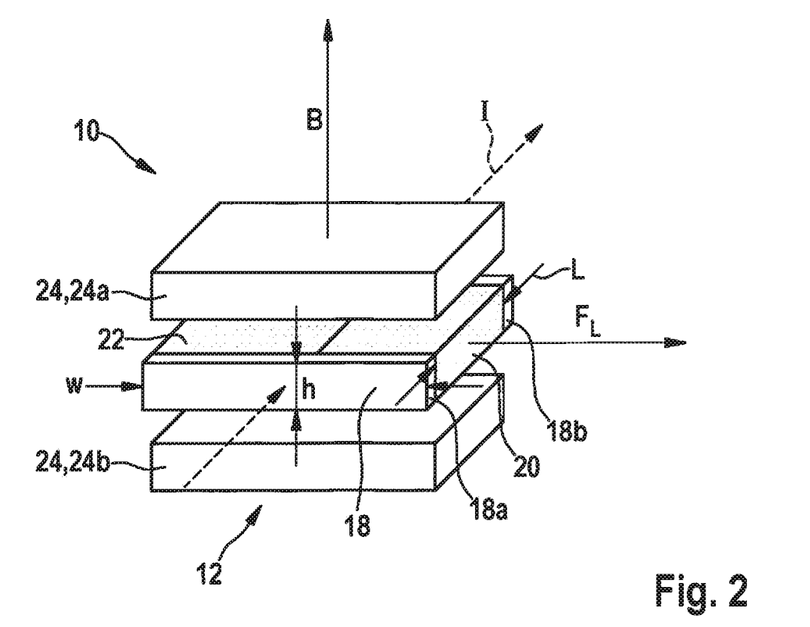
FIG. 2 schematically shows a representation of a second specific embodiment of the hydraulic device.

FIG. 2 schematically shows a representation of a second specific embodiment of the hydraulic actuator device.

Only one actuator module 12 is depicted merely by way of example in hydraulic actuator device 10 schematically depicted with the aid of FIG. 2. Hydraulic actuator device 10 may, however, also have multiple actuator modules 12 that include the features cited below.

Actuator module 12 includes an electrode unit 18 (having at least two electrodes 18a and 18b), with the aid of which the electrical current flow having a current intensity I (for example, a current density j) is creatable/is created by the electrically conductive medium 20. The at least two electrodes 18a and 18b of electrode unit 18 may, for example, be situated on opposite sides of a medium line 22 filled with electrically conductive medium 20 of the hydraulic system fitted with hydraulic actuator device 10. For current density j of the current flow, the following (simplified) equation applies (Equation 1):

$$j = \frac{I}{h * w^3} \quad \text{(Equation 1)}$$

where h is a height of medium line 22 oriented perpendicularly to the current flow and w is a width of a section of medium line 22 passed through by the current flow oriented perpendicularly to the current flow.

Actuator module 12 also includes a magnetic unit 24 (having two permanent magnets 24a and 24b, for example, and/or at least one energizable/energized coil), with the aid of which a magnetic field B of actuator module 12 is creatable/is created. Magnetic field B may, for example, be a chronologically constant magnetic field B. The current flow in electrically conductive medium 20 triggered with the aid of electrode unit 18 interacts therefore with magnetic field B of actuator module 12 permeating electrically conductive medium 20. Magnetic field B of actuator module 12 generated by magnetic unit 24 is oriented with respect to the current flow in such a way that a Lorentz force $F_L$ is creatable/is created on at least the accelerated portion of electrically conductive medium 20, with the aid of which at least the portion of electrically conductive medium 20 is acceleratable/is accelerated into the at least one partial volume of the hydraulic system (against a counterforce acting against the pressure build-up).

The created Lorentz force $F_L$ accelerates at least the portion of electrically conductive medium 20 and generates a pressure build-up in the at least one partial volume 14 (not depicted) of the hydraulic system. If the current flow/its current density j is oriented perpendicularly to magnetic field B, then equation (Equation 2) applies for a Lorentz force density $f_L$ of Lorentz force $F_L$, in which:

$$f_L = B * j = B * \frac{I}{h * w^3} \quad \text{(Equation 2)}$$

Thus, Lorentz force $F_L$ results with the aid of an integration of Lorentz force density $f_L$ over fluid volume V (V=h*w*L) impregnated by magnetic field B, according to equation (Equation 3), in which:

$$F_L = B * \frac{I}{h * w} * h * w * L = B * I * L \quad \text{(Equation 3)}$$

where L is an extension of medium line 22 oriented along the current flow.

Lorentz force $F_L$ accelerates electrically conductive medium 20 perpendicularly to the plane spanned by current density j and magnetic field B. Thus, for a pressure p in that plane, equation (Equation 4) applies, in which:

$$p = \frac{F_L}{h*l} = \frac{B*l}{h} \qquad \text{(Equation 4)}$$

Thus, for example, a magnetic field B having a magnetic flux density of 1 T (Tesla), a current intensity I of 100 A (amperes) and a height h of 1 mm (millimeters) result in a pressure p of 1 bar. A direction and an absolute value of created pressure p is therefore a function of directions and intensities of magnetic field B and of the current flow. Thus, the operating principle depicted with the aid of FIG. 2 permits a comparatively exact pressure metering, a relatively uniform pressure distribution and a reliable pressure behavior (also without the use of valves). (The variables w and L have no direct influence on pressure p, but may be easily selected to meet requirements with respect to a preferably low electrical and hydraulic resistance).

Figure 3:
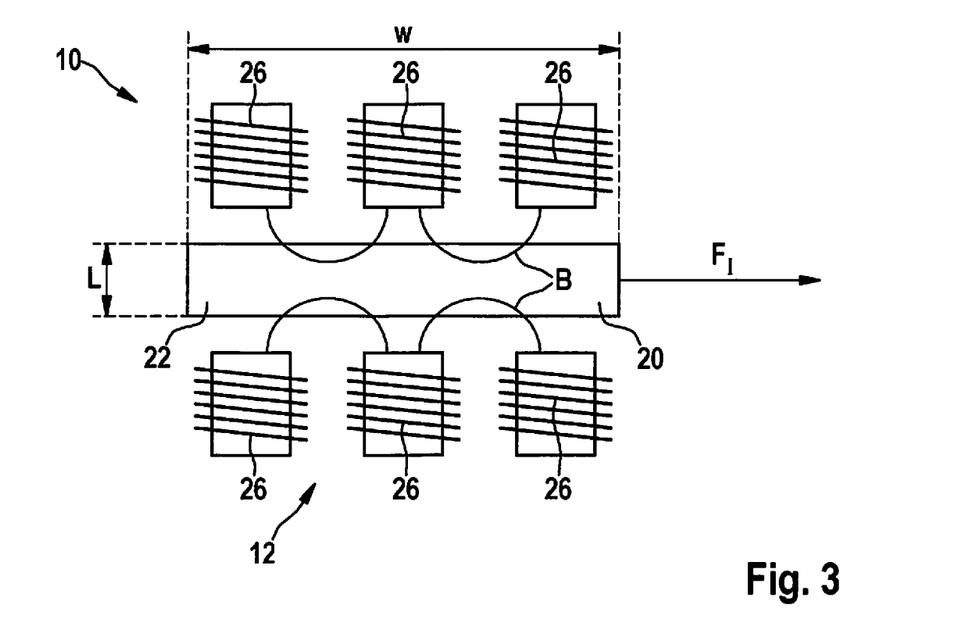
FIG. 3 schematically shows a representation of a third specific embodiment of the hydraulic actuator device.

FIG. 3 schematically shows a representation of a third specific embodiment of the hydraulic actuator device.

Hydraulic actuator device 10 illustrated with the aid of FIG. 3, of which only one actuator module 12 is depicted by way of example, includes a principle (for current feed/current generation in electrically conductive medium 20) different from the previously explained specific embodiment. Actuator module 12 of hydraulic actuator device 10 of FIG. 1 includes at least one coil unit/coil 26. With the aid of chronologically varying magnetic field B created/generated by the at least one (energized) coil unit 26, it is possible to create a so-called "induction force" $F_I$ (often also referred to as Lorentz force) on at least the portion of electrically conductive medium 20 (with the aid of an inductive current feed/current generation in electrically conductive medium 20), in such a way that at least the portion of electrically conductive medium 20 is acceleratable/is accelerated into the at least one partial volume of the hydraulic system against the counterforce acting against the pressure build-up.

By activating a current flowing through the at least one coil unit 26, it is possible to generate a current flow having a current density j in electrically conductive medium 20 (due to the law of magnetic induction). Multiple coil units/coils 26 may, for example, be positioned along medium line 22 and may be activated with different phases, so that a so-called "magnetic shifting field" occurs as chronologically varying magnetic field B of actuator module 12. In one alternative specific embodiment, chronologically varying magnetic field B (as a "magnetic shifting field") may also be generated by at least one moving permanent magnet.

The principle depicted with the aid of FIG. 3 also enables an exact "metering" of induction force $F_I$ merely by activating the at least one coil unit 26, and thus yields the same advantages as the operating principle of FIG. 2. In addition, the principle of FIG. 3 requires no direct contact with electrically conductive medium 20 and is therefore resistant to contamination.

It is recalled once again that the principles of FIGS. 2 and 3 dispense with a use of a movable/moving element/part. Respective hydraulic actuator devices 10 exhibit therefore a good NVH behavior (noise vibration harshness). Due to the abandonment of a movable/moving element/part, an operation of above described hydraulic actuator devices 10 is also not associated with a (mechanical) wear. Thus, above described hydraulic actuator devices 10 also exhibit a comparatively high robustness. A risk of damage/risk of wear of above described hydraulic actuator devices 10, in particular, is significantly lower than that of conventional actuators (having a movable/moving element/part such as, for example, pumps and plunger devices). Above described hydraulic actuator devices 10 also enable in addition a high accuracy and good uniformity when creating the desired pressure build-up.

Figure 4:
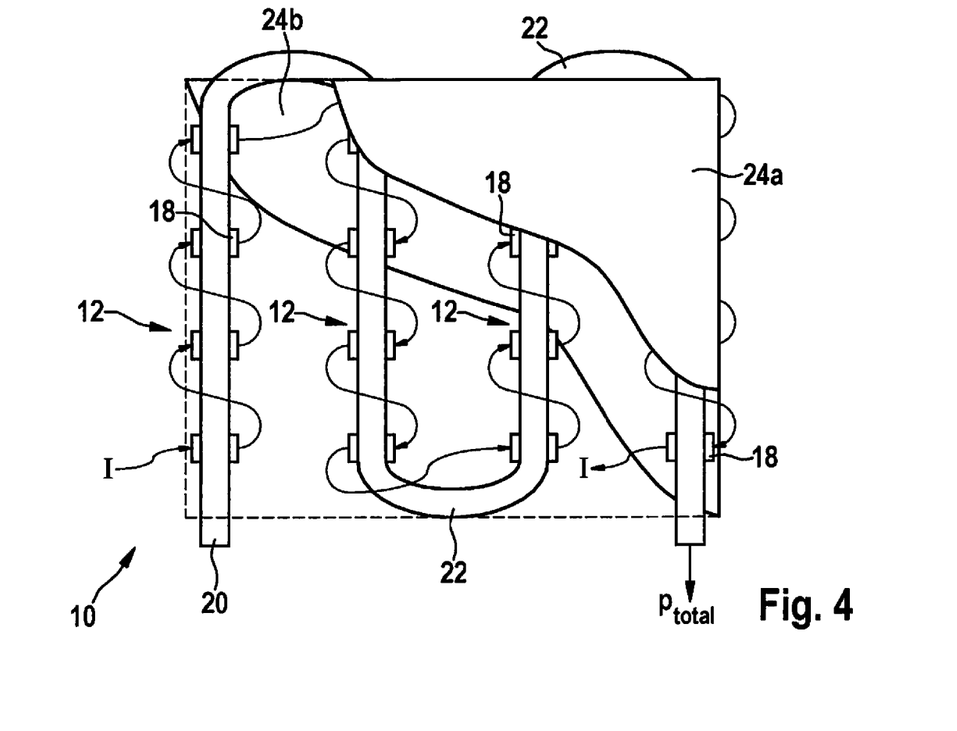
FIG. 4 schematically shows a representation of a fourth specific embodiment of the hydraulic actuator device.

FIG. 4 schematically shows a representation of a fourth specific embodiment of the hydraulic actuator device.

Hydraulic actuator device 10 schematically depicted in FIG. 4 includes n/multiple actuator modules 12. Hydraulic actuator device 10 is situatable/is situated on and/or in the hydraulic system in such a way that at least some of the n actuator modules 12 of hydraulic actuator device 10 situated on and/or in the hydraulic system are situated in succession on a single medium line 22 of the hydraulic system. The n actuator modules 12 are preferably connected in series. In this way, a "series arrangement" or "series connection" of n actuator modules 12 is implemented.

For pressure $p_{total}$ resulting from the operation of the "series arrangement" of n actuator modules 12, the equation (Equation 5) applies, in which:

$$p_{total} = n * \frac{B*I}{h} \qquad \text{(Equation 5)}$$

Thus, a pressure p of approximately 100 bar may be easily built up with the aid of multiple actuator modules 12 (such as, for example, n=100). A pressure p of approximately 100 bar in a wheel brake cylinder is sufficient to create a significant braking torque on at least one adjacent/assigned rotating wheel. Due to the minimal extensions/sizes of the individual actuator modules 12, a hydraulic actuator device 10 equipped with a large number n of actuator modules 12 is implementable easily and with a compact design.

To reduce a longitudinal extension of the "series arrangement" or "series connection," medium line 22 depicted in FIG. 4 has a meander-shaped design and the n actuator modules 12 are connected in series. Two permanent magnets 24a and 24b situated on opposite sides of medium line 22 are sufficient for all n actuator modules 12. (However, multiple (smaller) permanent magnets 24a and 24b may potentially also be used). This may also be described as a "meander-shaped series arrangement" or a "meander-shaped series connection" of the n actuator modules 12.

Figure 5:
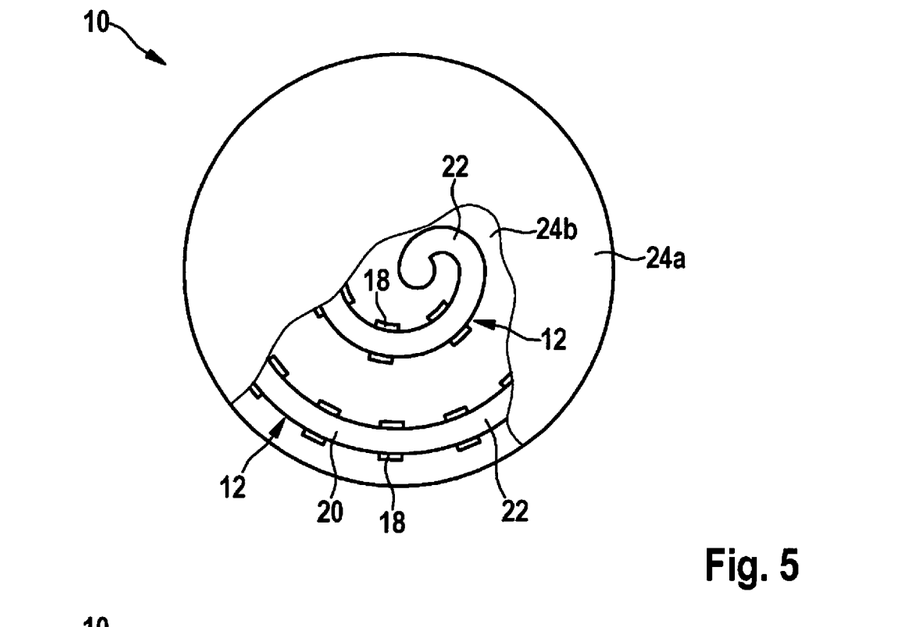
FIG. 5 schematically shows a representation of a fifth specific embodiment of the hydraulic actuator device.

FIG. 5 schematically shows a representation of a fifth specific embodiment of the hydraulic actuator device.

Medium line 22 depicted in FIG. 5 has a "helical" design. The n actuator modules 12 of hydraulic actuator device 10 are connected in series. Not more than the two permanent magnets 24a and 24b situated on opposite sides of medium line 22 are required for all n actuator modules 12. Thus, hydraulic actuator device 10 of FIG. 5, which is describable as a "2D-spiral series arrangement" or "2D-spiral series connection" of n actuator modules 12, requires comparatively little installation space.

Figure 6:
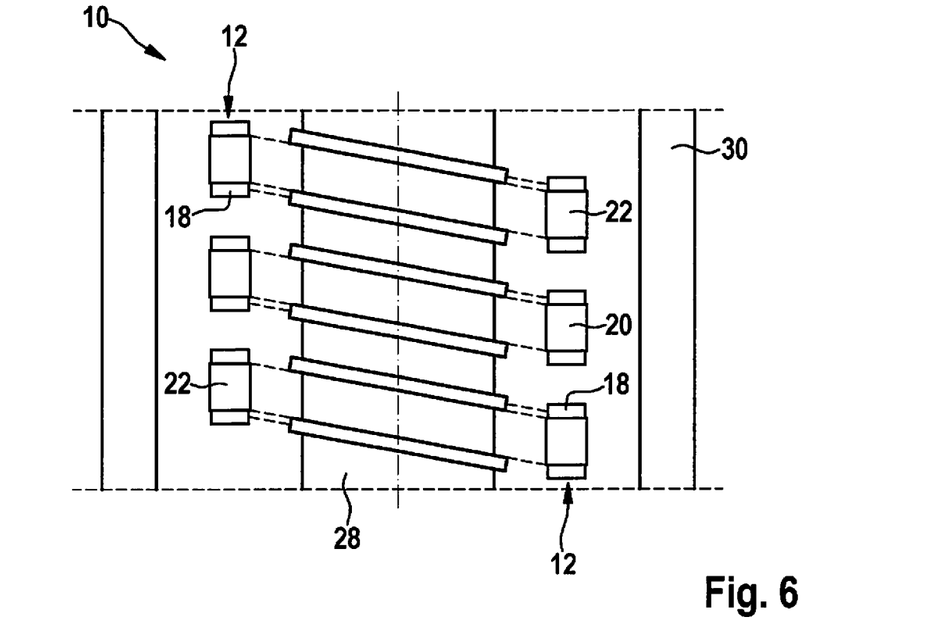
FIG. 6 schematically shows a representation of a sixth specific embodiment of the hydraulic actuator device.

FIG. 6 schematically shows a representation of a sixth specific embodiment of the hydraulic actuator device.

In the specific embodiment of FIG. 6, medium line 22 is a line winding around a core 28 (a so-called "fluid coil"), which is framed by a cylindrical jacket-like permanent magnet 30. The n actuator modules 12 of hydraulic actuator device 10 situated on medium line 22 are connected in series. This may also be described as a "3D-spiral series arrangement" or "3D-spiral series connection" of actuator modules 12.

Core 28 is preferably made of a ferromagnetic material, for example, having a permeability $\mu_r$>1. Core 28 may be, in particular, an iron core. A permanent magnet (together with cylindrical jacket-like permanent magnet 30) may also be used as core 28. In one alternative specific embodiment, it is also possible, instead of cylindrical jacket-shaped permanent magnet 30, to use a cylindrical jacket made of a ferromagnetic material, preferably having a permeability $\mu_r$>1, together with a permanent magnet as core 28.

Figure 7:
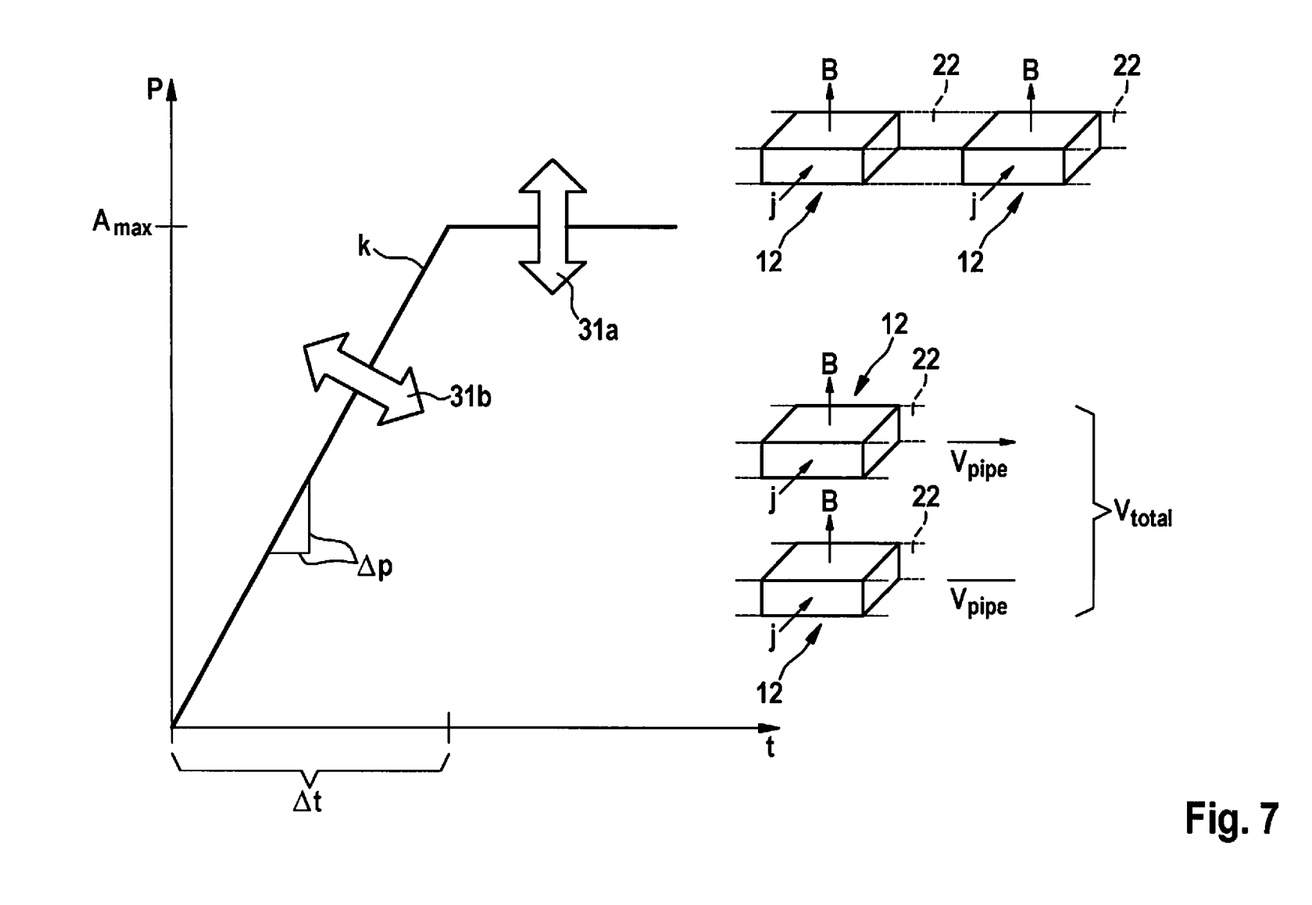
FIG. 7 shows a coordinate system for explaining a seventh specific embodiment of the hydraulic actuator device.

FIG. 7 shows a coordinate system for explaining a seventh specific embodiment of the hydraulic actuator device, an x-axis being a time axis t and a y-axis indicating a pressure p creatable with the aid of the hydraulic actuator device.

A pressure build-up characteristic curve k having a slope Δp during a pressure build-up time interval Δt and a maximum amplitude $A_{max}$ after pressure build-up time interval Δt is plotted in the coordinate system of FIG. 7. The maximum amplitude $A_{max}$ is increasable with the aid of an increase in the number n of actuator modules 12 situated in a "series arrangement" or "series connection" (arrow 31a). Slope Δp, which reflects a dynamic of the hydraulic actuator device, may also be increased with the aid of a "parallel arrangement" or "parallel connection" of actuator modules 12 (arrow 31b).

In the "parallel arrangement" or "parallel connection," hydraulic actuator device 10 including the multiple actuator modules 12 is situatable/is situated on and/or in the hydraulic system in such a way that at least some of actuator modules 12 of hydraulic actuator device 10 situated on and/or in the hydraulic system are situated on m medium lines 22 of the hydraulic system extending in parallel to one another, m being at least 2. Thus, applicable for a total volume $V_{total}$ accelerated from all m medium lines 22 is (Equation 6), in which:

$$V_{total} = \Sigma V_{pipe} \quad \text{(Equation 6)}$$

where $V_{pipe}$ are the individual volumes accelerated from respective medium lines 22.

Figure 8:
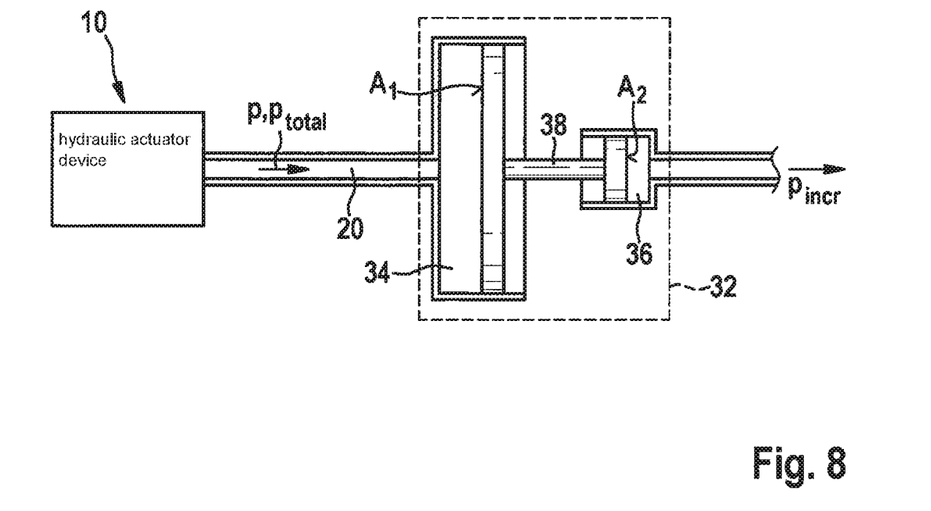
FIG. 8 schematically shows a representation of an eighth specific embodiment of the hydraulic actuator device and of the hydraulic system equipped with the hydraulic actuator device.

FIG. 8 schematically shows a representation of an eighth specific embodiment of the hydraulic actuator device, and of the hydraulic system equipped with the hydraulic actuator device.

Hydraulic actuator device 10 delineated in FIG. 8 cooperates with a hydraulic amplifier 32. Hydraulic amplifier 32 includes an adjustable piston 38 situated between a first volume 34 and a second volume 36, which delimits first volume 34 with an active surface $A_1$ and the second volume 36 with a second active surface $A_2$ smaller than first active surface $A_1$. (One part of the hydraulic system connected to second volume 36 may be filled with a medium other than electrically conductive medium 20). The result is thus an amplification factor k according to equation (Equation 7) in which:

$$k = \frac{A_1}{A_2} \quad \text{(Equation 7)}$$

Accordingly, a pressure p or $p_{total}$ created with the aid of hydraulic device 10, may be increased to an amplifier pressure $p_{incr}$ according to equation (Equation 8) or (Equation 9), in which:

$$p_{incr} = k * p = k * \frac{B * I}{h} \quad \text{(Equation 8)}$$

$$p_{incr} = k * p_{total} = k * n * \frac{B * I}{h} \quad \text{(Equation 9)}$$

Hydraulic amplifier 32 thus increases a flexibility in the design of the hydraulic system. In this way, it is possible to create even a relatively high pressure $p_{incr}$, such as, for example, a pressure $p_{incr}$ over 100 bar, in the at least one partial volume 14.

Figure 9:
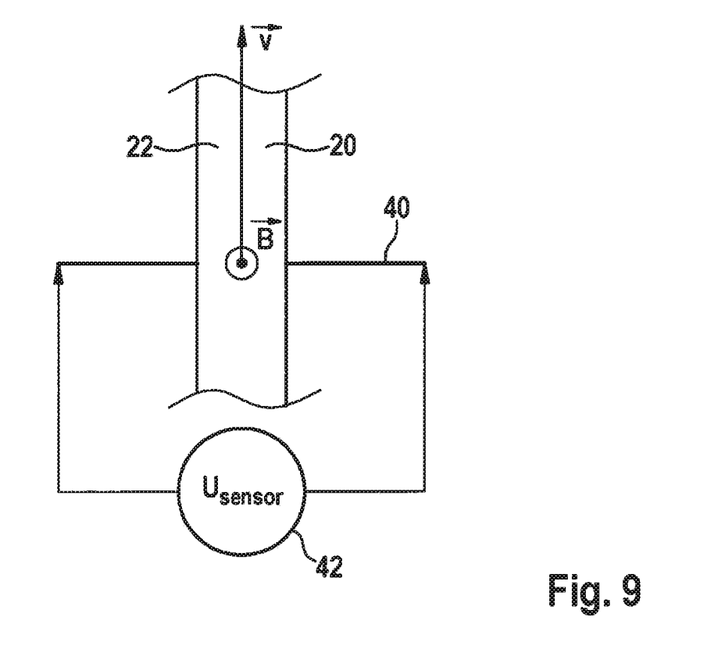
FIG. 9 schematically shows a representation of one specific embodiment of the sensor device.

FIG. 9 schematically shows a representation of one specific embodiment of the sensor device.

The sensor device schematically depicted in FIG. 9 may cooperate with each of the above described hydraulic actuator devices 10. The sensor device is also designable in such a way that it may be situated/is situated on and/or in each hydraulic system explained above. The sensor device includes at least one sensor electrode unit 40 (preferably at least one electrode pair) and at least one magnetic field generation unit (such as, for example, at least one permanent magnet and/or at least one energizable coil), which in each case is designed in such a way that at least one magnetic field B is generatable/is generated. Due to an interaction of electrically conductive medium 20 of the hydraulic system with the at least one magnetic field B, at least one induction voltage $U_{sensor}$ is creatable/is created on the at least sensor electrode unit 40.

The sensor device also has an evaluation unit 42, which is designed to tap at least one voltage magnitude $U_{sensor}$ with respect to the at least one present induction voltage $U_{sensor}$, and taking into account the at least one tapped voltage magnitude $U_{sensor}$, to establish and output a piece of information regarding an (average) flow rate v of electrically conductive medium 20. The piece of information may, for example, be the (average) flow rate v (or the average flow velocity) of electrically conductive medium 20 or a through-flow Q through the medium line. (Inductive voltage $U_{sensor}$ correlates with the (average) flow velocity v, or with through-flow Q).

While a through-flow measurement is impossible or barely possible in conventional hydraulic systems, and thus a regulation in conventional hydraulic systems is possible only with the aid of pressure sensors (for measuring a pressure as a secondary physical variable), this problem is eliminated in each hydraulic system explained above.

The measuring principle described herein is also implementable with the aid of some of the above described hydraulic actuator devices 10, the at least one electrode unit 18 of the at least one actuator module 12 being usable as the at least one sensor electrode unit 40. Thus, only one electronics system of some of the above described hydraulic actuator devices 10 must be programmed in such a way that the function of evaluation unit 42 of the sensor device is thereby implementable.

Figure 10:
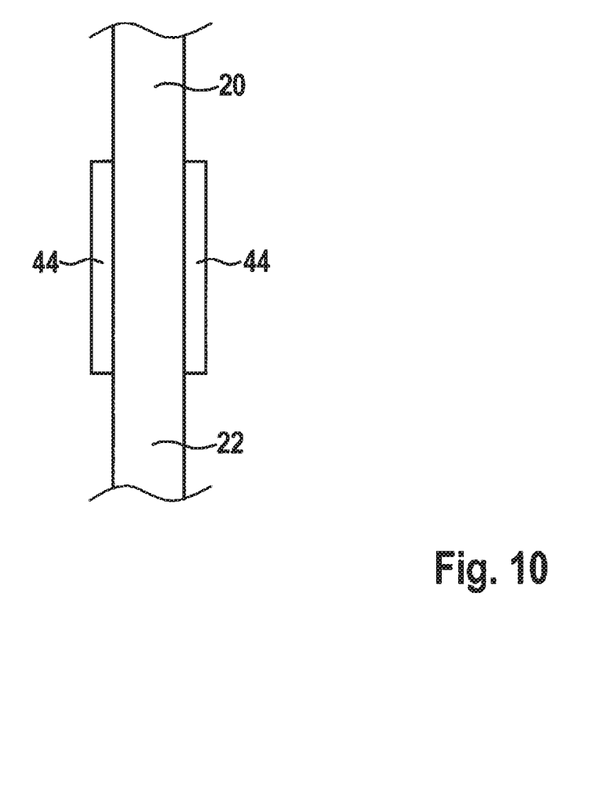
FIG. 10 schematically shows a representation of one specific embodiment of the temperature control device.

FIG. 10 schematically shows a representation of one specific embodiment of the temperature control device.

The temperature control device schematically depicted in FIG. 10 may also cooperate with each of the above described hydraulic actuator devices 10 and is designable in such a way that it may be situatable/is situated on and/or in each hydraulic system explained above. The temperature control device may be used for controlling the temperature of (temperature maintenance) and/or for heating electrically conductive medium 20.

Temperature control device of FIG. 10 includes at least one electrode 44 (preferably at least one electrode pair), via which a heating current is conductable into the electrically conductive medium of the hydraulic system, as a result of which heat is generated in electrically conductive medium 20 and the solidification thereof may be prevented. Thus, the temperature control device functions according to the principle of an electrical resistance heating by direct current feed via the at least one electrode 44 into the electrically conductive medium, so that a sufficient dynamic is continually ensured due to a low viscosity of electrically conductive medium 20 even at relatively low ambient temperatures.

The temperature control principle and/or heating principle described herein is also implementable with the aid of some of the above described hydraulic actuator devices 10 by using at least one electrode 18a and 18b as the at least one electrode 44.

In one alternative specific embodiment, the temperature control device may also include at least one coil, with the aid of which a chronologically varying magnetic field B is creatable/is created in conductive medium 20 of the hydraulic system. This temperature control principle and/or heating principle is also implementable with the aid of some of the above described hydraulic actuator devices 10 by using the at least one coil unit 26 as a "temperature control coil and/or heating coil." In this way, the principle of an inductive heating may also be utilized.

Figure 11:
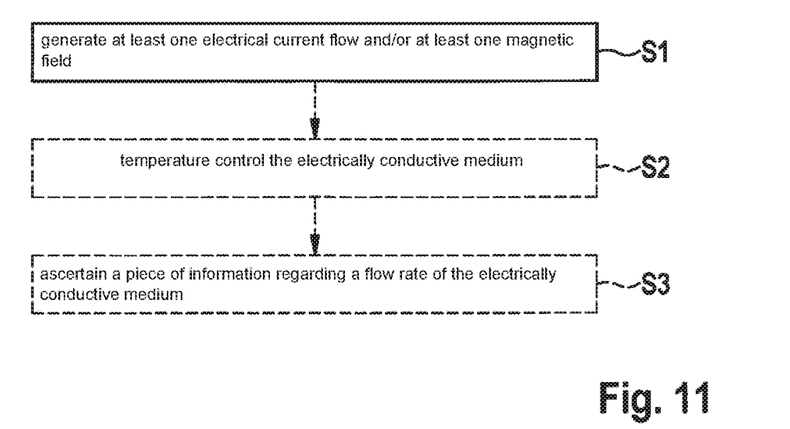
FIG. 11 shows a flow chart for explaining one specific embodiment of the method for creating a pressure build-up in at least one partial volume of a hydraulic system filled with an electrically conductive medium.

FIG. 11 shows a flow chart for explaining one specific embodiment of the method for creating a pressure build-up in at least one partial volume of a hydraulic system filled with an electrically conductive medium.

In a method step S1, at least one electrical current flow and/or at least one magnetic field is/are generated in such a way that at least one portion of the electrically conductive medium is accelerated into the at least one partial volume of the hydraulic system due to its interaction with the at least one electrical current flow and/or with the at least one magnetic field, as a result of which the pressure build-up is created in the at least one partial volume of the hydraulic system. Examples of the electrically conductive fluid and of creating the current flows/magnetic fields of suitable devices interacting therewith were already enumerated above. Multiple electrical current flows and/or multiple magnetic fields may, for example, be generated in series in a medium line of the hydraulic system in such a way that the portion of the electrically conductive medium in the medium line is transferred and continuously accelerated by the generated electrical current flows and/or magnetic fields. Alternatively or in addition, multiple electrical current flows and/or multiple magnetic fields may be generated in at least two medium lines of the hydraulic system extending in parallel to one another in such a way that as a portion, individual volumes of the electrically conductive medium in the at least two medium lines are combined as a total volume in one collection volume at which the at least two medium lines discharge. A through-flow may also be created/triggered with the aid of method step S1.

A method step S2, in which the electrically conductive medium in the hydraulic system is temperature controlled (or heated) by introducing a heating current into the electrically conductive medium of the hydraulic system via at least one electrode, may optionally also be carried out before and/or during method step S1. The temperature control and/or heating of the electrically conductive medium may also be created by generating a chronologically varying magnetic field in the conductive medium of the hydraulic system with the aid of at least one coil.

An (optional) method step S3 for ascertaining a piece of information regarding a flow rate of the electrically conductive medium in the hydraulic system may also be carried out during method step S1. For this purpose, at least one magnetic field is generated in such a way that at least one induction voltage is created at at least one sensor electrode unit due to an interaction of the electrically conductive medium of the hydraulic system with the at least one magnetic field. At least one voltage magnitude with respect to the at least one induction voltage is tapped, and the piece of information regarding the flow rate of the electrically conductive medium is established taking into account the at least one tapped voltage magnitude. A resulting pressure build-up dynamic may be derived.

What is claimed is:

1. A hydraulic actuator device for a hydraulic system filled with an electrically conductive medium, the hydraulic actuator device being situatable and/or is situated on and/or in the hydraulic system, the hydraulic actuator device including at least one actuator module, each of which being configured in such a way that at least a portion of the electrically conductive medium is acceleratable into at least one partial volume of the hydraulic system due to an interaction of the at least portion of the electrically conductive medium with an electrical current flow generated: (i) using the respective actuator module, and/or (ii) using a magnetic field created using the respective actuator module, as a result of which acceleration a pressure build-up is creatable in the at least one partial volume of the hydraulic system, wherein the at least one actuator module includes at least one electrode unit and at least one magnetic unit, and a Lorentz force is creatable on at least the portion of the electrically conductive medium using an electrical current flow generated by the at least one electrode unit and a magnetic field created by the at least one magnetic unit in such a way that at least the portion of the electrically conductive medium is acceleratable into the at least one partial volume of the hydraulic system against a counterforce acting against the pressure build-up, wherein the hydraulic actuator device includes multiple actuator modules and is situatable or is situated on and/or in the hydraulic system in such a way that at least some of the actuator modules of the hydraulic actuator device situated on and/or in the hydraulic system are situated in succession on a medium line of the hydraulic system, and wherein the medium line has one of a meander-shaped and helical design.

2. A hydraulic actuator device for a hydraulic system filled with an electrically conductive medium, the hydraulic actuator device being situatable and/or is situated on and/or in the hydraulic system, the hydraulic actuator device including at least one actuator module, each of which being configured in such a way that at least a portion of the electrically conductive medium is acceleratable into at least one partial volume of the hydraulic system due to an interaction of the at least portion of the electrically conductive medium with an electrical current flow generated: (i) using the respective actuator module, and/or (ii) using a magnetic field created using the respective actuator module, as a result of which acceleration a pressure build-up is creatable in the at least one partial volume of the hydraulic system, wherein the at least one actuator module includes at least one coil unit, and an induction force is creatable on at least the portion of the electrically conductive medium using a chronologically varying magnetic field created by the at least one coil unit in such a way that at least the portion of the electrically conductive medium is acceleratable into the at least one partial volume of the hydraulic system against a counterforce acting against the pressure build-up, wherein the hydraulic actuator device includes multiple actuator modules and is situatable or is situated on and/or in the hydraulic system in such a way that at least some of the actuator modules of the hydraulic actuator device situated on and/or in the hydraulic system are situated in succession on a medium line of the hydraulic system, and wherein the medium line has one of a meander-shaped and helical design.

3. A hydraulic system, comprising:
at least one hydraulic actuator device for the hydraulic system, the hydraulic system being filled with an electrically conductive medium, the hydraulic actuator device being situatable and/or is situated on and/or in the hydraulic system, the hydraulic actuator device including at least one actuator module, each of which being configured in such a way that at least a portion of the electrically conductive medium is acceleratable into at least one partial volume of the hydraulic system due to an interaction of the at least portion of the electrically conductive medium with an electrical current flow generated: (i) using the respective actuator module, and/or (ii) using a magnetic field created using the respective actuator module, as a result of which acceleration a pressure build-up is creatable in the at least one partial volume of the hydraulic system; and
the electrically conductive medium filled into the hydraulic system, wherein the at least one actuator module includes at least one electrode unit and at least one magnetic unit, and a Lorentz force is creatable on at least the portion of the electrically conductive medium using an electrical current flow generated by the at least one electrode unit and a magnetic field created by the at least one magnetic unit in such a way that at least the portion of the electrically conductive medium is acceleratable into the at least one partial volume of the hydraulic system against a counterforce acting against the pressure build-up, wherein the hydraulic actuator device includes multiple actuator modules and is situatable or is situated on and/or in the hydraulic system in such a way that at least some of the actuator modules of the hydraulic actuator device situated on and/or in the hydraulic system are situated in succession on a medium line of the hydraulic system, and wherein the medium line has one of a meander-shaped and helical design.

4. The hydraulic system as recited in claim 3, wherein the electrically conductive medium is: an electrically conductive fluid, and/or an electrically conductive gas, and/or an ionic fluid, and/or at least one electrolyte, and/or at least one plasma, and/or at least one liquid metal, and/or gallium, and/or lithium, and/or sodium, and/or mercury, and/or a liquid metal alloy, and/or a gallium-indium-tin alloy, and/or a sodium-potassium alloy.

5. The hydraulic system as recited in claim 3, wherein the hydraulic system is: a hydraulic work machine system, or a robot, or a hydraulic construction machine system, or a hydraulic agricultural machine system, or a hydraulic load hoisting system, or a hydraulic elevator system, or a hydraulic lifting platform system, or a hydraulic braking system, or a hydraulic transmission system, or a hydraulic power steering system, or a hydraulic chassis control system, or a hydraulic convertible roof system, or a hydraulic excavator system, or a hydraulic tractor system, or a hydraulic forklift system, or a hydraulic crane system, or a hydraulic forest machinery system, or a hydraulic heavy-duty transport system, or a hydraulic wing flap system, or a hydraulic press system, or a hydraulic scissor system, or a hydraulic folding machine system, or a hydraulic grinding machine system, or a hydraulic chipping system, or a hydraulic actuating drive system, or a hydraulic mill system, or a hydraulic punch system, or a hydraulic fire department rescue tool.

6. A method for creating a pressure build-up in at least one partial volume of a hydraulic system filled with an electrically conductive medium, the method comprising:
generating at least one electrical current flow and at least one magnetic field in a hydraulic actuator device of the hydraulic system in such a way that at least a portion of the electrically conductive medium is accelerated into the at least one partial volume of the hydraulic system due to an interaction of the at least portion of the electrically conductive medium with the at least one electrical current flow and/or with the at least one magnetic field, as a result of which acceleration the pressure build-up is created in the at least one partial volume of the hydraulic system, wherein a Lorentz force is creatable on at least the portion of the electrically conductive medium using the electrical current flow generated and the magnetic field in such a way that at least the portion of the electrically conductive medium is acceleratable into the at least one partial volume of the hydraulic system against a counterforce acting against the pressure build-up, wherein the hydraulic actuator device includes multiple actuator modules and is situatable or is situated on and/or in the hydraulic system in such a way that at least some of the actuator modules of the hydraulic actuator device situated on and/or in the hydraulic system are situated in succession on a medium line of the hydraulic system, and wherein the medium line has one of a meander-shaped and helical design.

7. The method as recited in claim 6, wherein multiple electrical current flows and/or multiple magnetic fields are generated in series in the medium line of the hydraulic system in such a way that the portion of the electrically conductive medium in the medium line is transferred and continuously accelerated by the generated electrical current flow and/or the at least one magnetic field.

8. A hydraulic system, comprising:
at least one hydraulic actuator device for the hydraulic system, the hydraulic system being filled with an electrically conductive medium, the hydraulic actuator device being situatable and/or is situated on and/or in the hydraulic system, the hydraulic actuator device including at least one actuator module, each of which being configured in such a way that at least a portion of the electrically conductive medium is acceleratable into at least one partial volume of the hydraulic system due to an interaction of the at least portion of the electrically conductive medium with an electrical current flow generated: (i) using the respective actuator module, and/or (ii) using a magnetic field created using the respective actuator module, as a result of which acceleration a pressure build-up is creatable in the at least one partial volume of the hydraulic system; and
the electrically conductive medium filled into the hydraulic system, wherein the at least one actuator module includes at least one coil unit, and an induction force is creatable on at least the portion of the electrically conductive medium using a chronologically varying magnetic field created by the at least one coil unit in such a way that at least the portion of the electrically conductive medium is acceleratable into the at least one partial volume of the hydraulic system against a counterforce acting against the pressure build-up, wherein the hydraulic actuator device includes multiple actuator modules and is situatable or is situated on and/or in the hydraulic system in such a way that at least some of the actuator modules of the hydraulic actuator device situated on and/or in the hydraulic system are situated in succession on a medium line of the hydraulic system, and wherein the medium line has one of a meander-shaped and helical design.

9. A method for creating a pressure build-up in at least one partial volume of a hydraulic system filled with an electrically conductive medium, the method comprising:
generating at least one electrical current flow and at least one magnetic field in a hydraulic actuator device of the hydraulic system in such a way that at least a portion of the electrically conductive medium is accelerated into the at least one partial volume of the hydraulic system due to an interaction of the at least portion of the electrically conductive medium with the at least one electrical current flow and/or with the at least one magnetic field, as a result of which acceleration the pressure build-up is created in the at least one partial volume of the hydraulic system, wherein an induction force is creatable on at least the portion of the electrically conductive medium using a chronologically varying magnetic field in such a way that at least the portion of the electrically conductive medium is acceleratable into the at least one partial volume of the hydraulic system against a counterforce acting against the pressure build-up, wherein the hydraulic actuator device includes multiple actuator modules and is situatable or is situated on and/or in the hydraulic system in such a way that at least some of the actuator modules of the hydraulic actuator device situated on and/or in the hydraulic system are situated in succession on a medium line of the hydraulic system, and wherein the medium line has one of a meander-shaped and helical design.

10. A hydraulic actuator device for a hydraulic system filled with an electrically conductive medium, comprising:
a plurality of actuator modules, which in each case is designed in such a way that at least a portion of the electrically conductive medium is acceleratable into at least one partial volume of the hydraulic system due to its interaction with an electrical current flow generated with the aid of the respective actuator module and/or with the aid of a magnetic field created with the aid of the respective actuator module, as a result of which a pressure build-up is creatable in the at least one partial volume of the hydraulic system,
wherein the actuator modules are situated in succession on a medium line,
wherein current flows of the plurality of the actuator modules are generated in a same direction in the medium line and/or the magnetic fields of the plurality of the actuator modules are generated in the same direction in the medium line to accelerate portions of the electrically conductive medium in the same direction in the medium line, wherein the hydraulic actuator device is situatable and/or is situated on and/or in the hydraulic system.

11. A method for creating a pressure build-up in at least one partial volume of a hydraulic system filled with an electrically conductive medium, comprising:
generating, by at least one actuator module of a plurality of actuator modules, at least one electrical current flow and/or at least one magnetic field in such a way that at least a portion of the electrically conductive medium in a medium line is accelerated into the at least one partial volume of the hydraulic system due to its interaction with the at least one electrical current flow and/or with the at least one magnetic field, as a result of which the pressure build-up is created in the at least one partial volume of the hydraulic system; and
generating at least one of current flows of the plurality of the actuator modules in the same direction in the medium line and magnetic fields of the plurality of the actuator modules in the same direction in the medium line to accelerate portions of the electrically conductive medium in the same direction in the medium line.

12. A hydraulic actuator device for a hydraulic system filled with an electrically conductive medium, comprising:
at least one actuator module, which in each case is designed in such a way that at least a portion of the electrically conductive medium is accelerable into at least one partial volume of the hydraulic system due to its interaction with an electrical current flow generated with the aid of the respective actuator module and/or with the aid of a magnetic field created with the aid of the respective actuator module,
wherein a Lorentz force is creatable on at least the portion of the electrically conductive medium with the aid of the electrical current flow and the magnetic field in such a way that at least the portion of the electrically conductive medium is acceleable into the at least one partial volume of the hydraulic system against a counterforce acting against the pressure build-up, and
wherein the accelerated portion of the electrically conductive medium moves to a first cylinder of the hydraulic system, as a result of which a pressure build-up is creatable in the first cylinder, wherein the hydraulic actuator device is situatable and/or is situated on and/or in the hydraulic system.

* * * * *